United States Patent
Peloquin et al.

[11] Patent Number: 5,874,143
[45] Date of Patent: Feb. 23, 1999

[54] PRESSURE SENSITIVE ADHESIVES FOR USE ON LOW ENERGY SURFACES

[75] Inventors: Richard L. Peloquin, Maplewood; Albert I. Everaerts, Oakdale; Kenneth D. Wilson, Stillwater; Stephen J. Galick, Oakdale, all of Minn.

[73] Assignee: Minnesota Mining and Manufacturing Company, St. Paul, Minn.

[21] Appl. No.: 664,730

[22] Filed: Jun. 17, 1996

Related U.S. Application Data

[63] Continuation of Ser. No. 606,988, Feb. 26, 1996, abandoned.

[51] Int. Cl.⁶ ............................................................ C09J 7/02
[52] U.S. Cl. .................... 428/40.1; 156/331.1; 156/332; 428/40.2; 428/41.3; 428/41.5; 428/41.7; 428/41.8; 428/42.1; 525/305; 525/329.8; 525/329.9; 525/330.1; 525/328.2; 525/329.4
[58] Field of Search ................... 428/40.1, 40.2, 428/41.3, 41.5, 41.7, 41.8, 42.1; 525/305, 329.8, 329.9, 330.1, 328.2, 329.4; 156/331.1, 332

[56] References Cited

U.S. PATENT DOCUMENTS

| | | | |
|---|---|---|---|
| 3,314,838 | 4/1967 | Erwin | 156/71 |
| 4,352,359 | 10/1982 | Larimore et al. | 128/640 |
| 4,418,120 | 11/1983 | Kealy et al. | 428/343 |
| 4,923,913 | 5/1990 | Chich et al. | 524/62 |
| 4,942,201 | 7/1990 | Briggs et al. | 525/71 |
| 5,049,608 | 9/1991 | Medina | 524/375 |
| 5,112,601 | 5/1992 | Briggs et al. | 428/412 |
| 5,141,790 | 8/1992 | Calhoun et al. | 428/40 |
| 5,221,706 | 6/1993 | Lee et al. | 524/156 |
| 5,225,470 | 7/1993 | Mancinelli | 524/271 |
| 5,296,277 | 3/1994 | Wilson et al. | 428/40 |
| 5,349,004 | 9/1994 | Kumar et al. | 524/461 |
| 5,373,041 | 12/1994 | Prejean | 524/143 |
| 5,380,779 | 1/1995 | D'Haese | 524/272 |
| 5,489,624 | 2/1996 | Kantner et al. | 524/376 |
| 5,599,601 | 2/1997 | Polski | 428/40.1 |
| 5,648,425 | 7/1997 | Everaerts | 515/100 |

FOREIGN PATENT DOCUMENTS

| | | |
|---|---|---|
| 0 645 439 A2 | 3/1995 | European Pat. Off. . |
| 55-105856 | 8/1991 | Japan . |
| WO 93/06182 | 4/1993 | WIPO . |
| WO 93/06184 | 4/1993 | WIPO . |

OTHER PUBLICATIONS

Patent Abstracts of Japan, vol. 013, No. 003 (1989).
Patent Abstracts of Japan, vol. 010, No. 013 (1986).

*Primary Examiner*—Nasser Ahmad
*Attorney, Agent, or Firm*—Gary L. Griswold; John H. Hornickel

[57] ABSTRACT

A vinyl graphic marking film or label coated with a pressure sensitive acrylic adhesive designed to achieve high or permanent adhesion to polymeric low energy surfaces is disclosed. In addition to good adhesion to low energy surfaces, the graphic marking film or label may have microperforated or micro-rough edges which initiate tearing when removal is attempted. The article maintains flexibility and film strength for easy fabrication in graphic marking film or label manufacture.

17 Claims, 2 Drawing Sheets

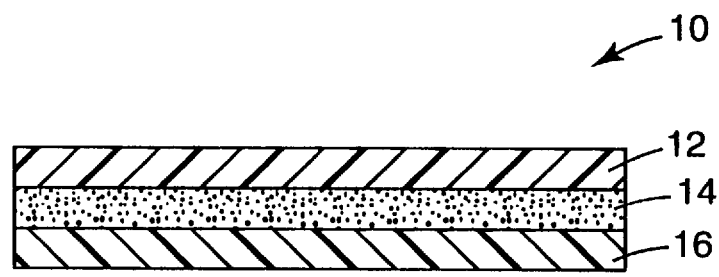
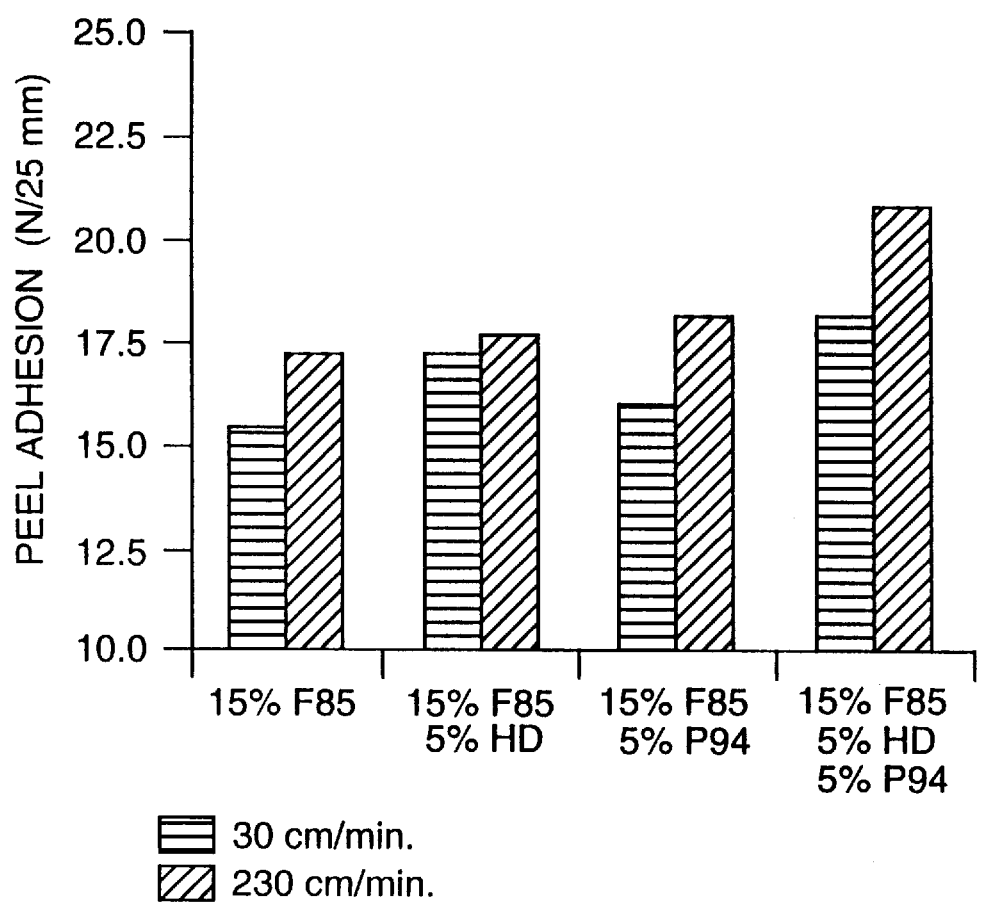

PRESSURE SENSITIVE ADHESIVES FOR USE ON LOW ENERGY SURFACES

This application is a continuation of application Ser. No. 08/606,988 filed Feb. 26, 1996, now abandoned.

FIELD OF THE INVENTION

This invention is in the field of adhesives, and more particularly, acrylic pressure sensitive adhesives which have improved bonding characteristics to low energy surfaces.

BACKGROUND

As used herein, the term "film" refers to a thin, flexible, single- or multi-layer polymeric sheet. The term is used interchangeably with the terms "backing" and "carrier web". Graphic marking films or labels formed from vinyl films coated with acrylic pressure sensitive adhesives (PSAs) are well-known in the art. However, to date, the ability to provide such label and graphic marking film films with high bonding strength, (i.e. non-removal), to low energy surfaces such as high density polyethylene and polypropylene plastics has not been possible without sacrificing important properties of the adhesive such as shear strength and cohesive strength.

As used herein, the term "low energy surfaces" is intended to mean those surfaces which exhibit low polarity and low critical surface tension (less than about 40 dynes/$cm^2$) characteristics. One example of a low energy surface is the surface of a polyolefin plastic. Among the PSAs, it is known that acrylic-based PSAs exhibit poorer bond characteristics to low surface energy polyolefin plastics than do rubber-based PSAs. This effect results from the greater difference in polarity between the acrylic PSA and the polyolefin surface as compared to that between the rubber PSA and the polyolefin surface. Unfortunately, however, it would be very desirable to use acrylic PSAs in many applications, since acrylic PSAs exhibit excellent outdoor durability, whereas rubber PSAs show poor ultraviolet and oxidative stability due to chemical unsaturation of the hydrocarbon elastomer.

Common physical methods to obtain high bond strength of pressure sensitive adhesives to polyolefin plastics include flame treating, which oxidizes the surface of the plastic, chemical etching with strong acids to increase polarity of the bonding surface, or the use of a primer or topcoat containing a chlorinated polyolefin. For example, Japanese Patent No. HEI 1(1989)-242676 discusses the use of chlorinated polyolefin resins in connection with pressure sensitive adhesives. One disadvantage of such surface treatment methods is that they are inefficient in that they add an additional process step when applying graphic marking films or labels to low energy surfaces. This is less than ideal since industrial consumers of graphic marking films and labels desire that these products can be easily applied in a single step without the need for additional, time consuming surface preparation methods.

For a permanent graphic marking film or label application, it would be desirable to have bond characteristics similar to those associated with rubber-based PSAs combined with the outdoor durability associated with acrylic PSAs. One method to increase bond strength of acrylic PSAs to low surface energy polyolefin plastics is to incorporate a compatible tackifier such as a rosin ester, a terpene phenolic resin or a hydrocarbon resin into the adhesive. Although the use of a tackifier dramatically improves bond strength as measured by peel force at low speeds, inclusion of these tackifiers raises the glass transition temperature (Tg) of the PSA which results in reduced low temperature performance and also causes a "shocky" or "zippy" peel characteristic at faster peel rates. This "shocky" or "zippy" peel is an undesirable characteristic which can result in easy removal of films and labels, as well as making them less tamper-resistant.

Additionally, loss in adhesive shear strength and cohesive strength is also observed if large amounts of tackifier or plasticizer are incorporated into the PSA.

In many applications, it is desirable that graphic marking films or labels be difficult to remove once they are applied to a surface. This may be accomplished by providing the graphic marking film or label film with a means by which attempts to remove it will result in tearing or other damage to the graphic marking film or label. A method to increase the destructibility of PSA coated vinyl labels or graphic marking films is to make the vinyl film backing less elastic or "brittle". This is achieved by adding a hard acrylic resin and decreasing the plasticizer level of the vinyl film.

U.S. Pat. Nos. 5,141,790 (Calhoun et al.) and 5,296,277 (Wilson et al.) the teachings of both of which are incorporated herein by reference, describe an adhesive film referred to commercially as Controltac Plus® film (available from Minnesota Mining and Manufacturing Company, hereafter "3M"). The adhesive surface of the Controltac Plus™ film is characterized in that it includes clustered domains of a non-adhesive material, referred to as "pegs" which extend a short distance from the adhesive surface. The patents also describe adhesive films in which the adhesive surface is microtextured or provided with a microtopological structure.

SUMMARY

The present invention relates to the incorporation of a plasticizer material into a tackified acrylic PSA. The resulting PSA is shown to provide improved bonding of polyvinylchloride graphic marking films and labels to low energy surfaces such as high density polyethylene plastic.

More specifically, the invention relates to tackified and plasticized acrylic PSA compositions comprising:

a) about 100 parts by weight of an acrylic copolymer, said acrylic copolymer comprising from about 70–98% by weight of one or more monofunctional acrylates having nontertiary alkyl groups with between 1 and 14 carbon atoms and from about 30–2% by weight of a polar monomer;

b) about 10–40 parts by weight of a tackifier;

c) about 3–10 parts by weight of a plasticizer; and d) optionally, a crosslinker.

The invention also relates to films which incorporate such tackified adhesives, and the use of those films as graphic marking films and labels.

Specific chemical classes of plasticizers, when incorporated into the tackified pressure sensitive acrylic adhesive, improve the bonding characteristics of the adhesive to low energy surfaces. The addition of plasticizer to a tackified acrylic adhesive has been found to improve the wet-out or "quick stick" to low energy surfaces. The addition of plasticizer offsets the increase in glass transition temperature caused by the tackifier and improves bond strength. When incorporated at levels of less than about 10 parts plasticizer per 100 parts adhesive, the presence of the plasticizer results in little effect on shear performance or cohesive strength of the adhesive.

Among the plasticizers discovered to improve bonding characteristics are polyglycol ethers, polyethylene oxides, phosphate esters, aliphatic carboxylic acid esters, benzoic esters, and combinations thereof. In addition, other plasticizers which improve bonding to low energy surfaces have been identified, however, these have been found to cause some decrease in cohesive strength. These include sulfonamides and aromatic carboxylic acid esters.

The incorporation of the specified plasticizers along with acrylic-compatible tackifiers allows one to construct an outdoor durable vinyl label or graphic marking film with improved adhesion to low energy surfaces, and in particular, high density polyethylene surfaces, without the need for physical or chemical treatment of the surfaces. In one embodiment, the label or graphic marking film construction may include a destructible vinyl film backing for vandal-resistant applications. In this embodiment, the graphic marking film or label can be die cut with a microperforated or micro-rough steel rule which will initiate tearing when removal is attempted. Removal is farther deterred by the improved adhesion characteristics of the graphic marking film or label. Despite these modifications to the film, the article maintains flexibility and film strength for easy fabrication in graphic marking film or label manufacture.

BRIEF DESCRIPTION OF THE DRAWINGS

FIG. 1 is a schematic representation of the cross-section of a vinyl film label.

FIG. 2 is a histogram plotting 180° peel adhesion for various adhesive compositions.

DETAILED DESCRIPTION OF THE INVENTION

Acrylic Pressure Sensitive Adhesives

Figure 3:
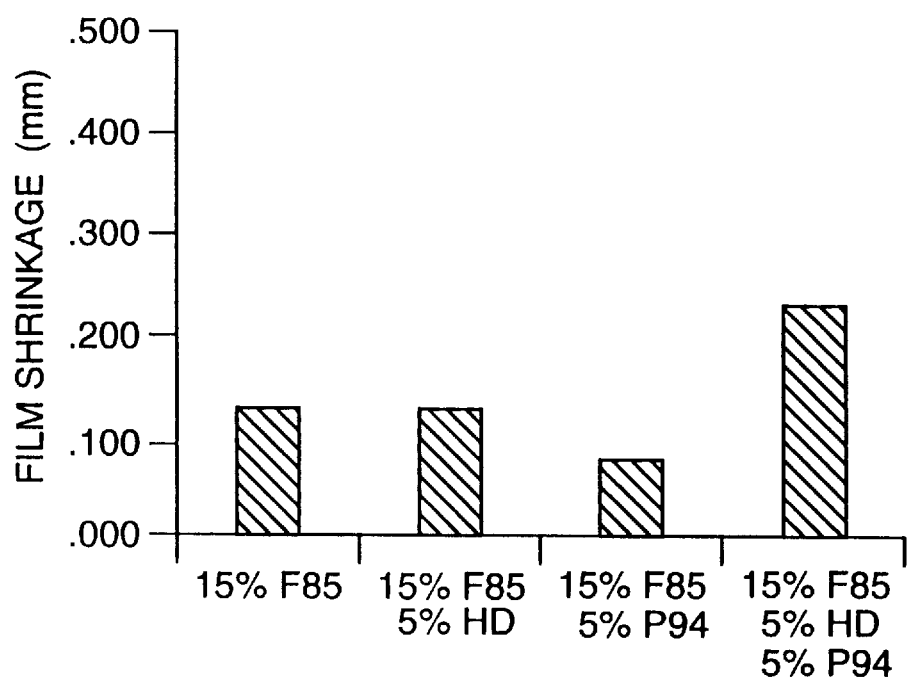
FIG. 3 is a histogram plotting film shrinkage for various adhesive compositions.

A variety of acrylic pressure sensitive adhesives commonly used in commercial applications for vinyl decorating graphics films include acrylic copolymers having from about 70–98% by weight of one or more monofunctional acrylates having nontertiary alkyl groups with between 1 and 14 carbon atoms and from about 30–2% by weight of a polar monomer.

In a preferred embodiment, the acrylic PSA is a copolymer of ethylenically-unsaturated alkyl acrylates ($C_1$–$C_{14}$) such as isooctylacrylate, 2-ethylhexyl acrylate, 2-methylbutylacrylate (MBA), N-butyl acrylate, methylacrylate (MA), ethylacrylate, and isobornylacrylate (IBA). The polar monomer can comprise ethylenically-unsaturated carboxylic acids such as methacrylic acids, acrylic acids (AA), itaconic acids, β-carboxyethylacrylates, fumaric acid, acrylamides (Acm) or other polar monomers such as n-vinyl pyrrolidone, N-vinyl caprolactam, 2-hydroxyethyl acrylate, and the like.

This class of adhesives bonds very aggressively to painted substrates and has excellent cohesive strength due, at least in part, to the polar monomer. While the use of polar monomers leads to adhesives with good cohesive strength, the high glass transition temperature contribution of these monomers to the adhesive is a disadvantage when formulating adhesives for "quick wet-out" on low energy surfaces.

One preferred PSA formulation for low energy surfaces was determined to be a 95/5 ratio isooctylacrylate/acrylic acid. This formulation resulted in a composition which was balanced between too much acrylic acid (which tended to "stiffen" the PSA formulation, leading to poor "wet-out"), and too little acrylic acid (which leads to PSA compositions with poor cohesive strength).

Several pressure sensitive adhesives having applicability to the present invention are presented in Table I below:

TABLE I

Acrylic Pressure Sensitive Adhesives

| Polymer Chemistry | | Molecular Weight |
|---|---|---|
| 90/10 | IOA/AA | $1.5 \times 10^6$ |
| 93/7 | IOA/AA | $1 \times 10^6$ |
| 93/7 | IOA/AA | $5 \times 10^5$ |
| 94/6 | IOA/AA | $5 \times 10^5$ |
| 95/5 | IOA/AA | $2 \times 10^5$ |
| 98/2 | IOA/AA | $1 \times 10^6$ |
| 70/22.5/7.5 | IOA/MA/AA | $2 \times 10^5$ |
| 96/4 | 2-MBA/Acm | $2 \times 10^5$ |
| 90/10 | 2-MBA/AA | $5 \times 10^5$ |
| 68/28/4 | IOA/IBA/AA | $2 \times 10^5$ |

Tackifiers

To obtain high bonding characteristics to low energy surfaces, the most commonly used tackifiers in acrylic pressure sensitive adhesives include terpene phenolics, rosins, rosin esters, esters of hydrogenated rosins, synthetic hydrocarbon resins and combinations thereof. The tackifiers which were evaluated are listed in the following Table II:

TABLE II

Common Acrylic PSA Tackifiers

| Company | Trade Name | Chemical Class |
|---|---|---|
| Hercules | Foral ® 85 | Hydrogenated Glycerol Ester of Rosin |
| Hercules | Hercolyn ® -D | Hydrogenated Methyl Ester of Rosin |
| Arizona Chemical | Nirez 2019 | Terpene Phenolic Resin |
| Union Camp | Uni-Tac-70 | Tall Oil Rosin |
| Hercules | Regalrez 6108 | Aromatic Hydrocarbon Resin |
| Exxon | ECR-180 | Petroleum Hydrocarbon Resin |

Hydrogenated rosin esters are the preferred tackifiers as a result of performance advantages which include: high levels of "tack", outdoor durability, oxidation resistance, compatibility with hot melt processing, and limited interference in post crosslinking of acrylic PSAs.

Tackifiers are typically added at a level of about 10–40 parts per 100 parts of dry acrylic PSA to achieve desired "tack". However, as noted above, the addition of these tackifier types can reduce shear or cohesive strength and raise the Tg of the acrylic PSA which is undesirable.

Crosslinkers

In order to increase shear or cohesive strength of acrylic pressure sensitive adhesives, a crosslinking additive is usually incorporated into the PSA. Two main types of crosslinking additives are commonly used. The first crosslinking additive is a thermal crosslinking additive such as a multi-functional aziridine. One example is 1,1'-(1,3-phenylene dicarbonyl)-bis-(2-methylaziridine) (CAS No. 7652-64-4), referred to herein as "Bisamide". Such chemical crosslinkers can be added into solvent-based PSAs after polymerization and activated by heat during oven drying of the coated adhesive.

In another embodiment, chemical crosslinkers which rely upon free radicals to carry out the crosslinking reaction may be employed. Reagents such as, for example, peroxides serve as a precursor source of free radicals. When heated sufficiently, these precursors will generate free radicals which bring about a crosslinking reaction of the polymer chains. A common free radical generating reagent is benzoyl peroxide. Free radical generators are required only in small quantities, but generally require higher temperatures to complete the crosslinking reaction than those required for the bisamide reagent.

The second type of chemical crosslinker is a photosensitive crosslinker which is activated by high intensity ultraviolet (UV) light. Two common photosensitive crosslinkers used for hot melt acrylic PSAs are benzophenone and 4-acryloxybenzophenone which is copolymerized into the PSA polymer. Another photocrosslinker, which can be post-added to the solution polymer and activated by UV light is a triazine; for example 2,4-bis(trichloromethyl)-6-(4-methoxy-phenyl)-s-triazine. These crosslinkers are activated by UV light generated from artificial sources such as medium pressure mercury lamps. Depending on the type of crosslinker, no more than about 0.5% by weight of chemical crosslinker typically is needed to achieve the desired crosslinking.

Aside from thermal or photosensitive crosslinkers, crosslinking may also be achieved using high energy electromagnetic radiation such as gamma or e-beam radiation.

A physical crosslinking agent may also be used. In one embodiment, the physical crosslinking agent is a high $T_g$ macromer such as those based upon polystyrene and polymethylmethacrylate which are used at about 2–6 parts by weight per 100 parts by weight dry adhesive.

Diisocyanates have also been reported as crosslinking agents for adhesives based on copolymers of acrylic acids.

Other Additives

Since acrylic pressure sensitive adhesives have excellent oxidative stability, additives such as antioxidant and UV light absorbers are generally not needed. In contrast, rubber-based PSAs typically include such additives.

Small amounts of heat stabilizer, (less than about 0.3% by weight), can be utilized in hot melt acrylic PSAs to increase thermal stability during processing.

Although not required, in some special applications, fillers (clay) or colorants ($TiO_2$ or carbon black) may be used as additives to impart opacity or color to the adhesive, or to make the adhesive system less expensive.

Backings

In one embodiment of the present invention, backings of plasticized, flexible polyvinylchloride films are used to form decorative films, labels or graphic marking films. A modified polyvinylchloride film is of interest for destructible or vandal resistant type labels or graphic marking films. This film has been made "brittle" or "tearable" by lowering the plasticizer level and adding a methylacrylate/butylacrylate copolymer resin (Elvacite™ 2013 available from Imperial Chemical Industries, Wilmington, Del.) to the PVC film formulation. These films may be made by casting from organosol solutions or calendered from an extrudable PVC resin.

Other backings of interest include, but are not limited to, polyesters, polyolefins, papers, foils, polyacrylates, polyurethanes, perfluoropolymers, polycarbonates, ethylene vinyl acetates, and the like. Backings of vinyl films, woven and nonwoven sheets, woven and nonwoven fabrics, papers and retroreflective sheeting are intended to be included.

Plasticizers

Plasticizers useful in the invention are selected from a wide variety of commercially available materials. Representative plasticizers are listed in Table III.

TABLE III

Acrylic PSA Plasticizers

| Company | Trade Name | Chemical Class | Chemical Name |
|---|---|---|---|
| ICI Americas | Pycal 94 | Polyethylene Oxide | Polyoxyethylene Aryl Ether |
| Monsanto | Santicizer 97 | Adipic Acid Ester | Dialkyl Adipate |
| Monsanto | Santicizer 141 | Phosphoric Acid Ester | 2-Ethylhexyl Diphenyl Phosphate |
| Monsanto | Santicizer 54 | Phosphoric Acid Ester | t-Butylphenyl Diphenyl Phosphate |
| Monsanto | DOA | Adipic Acid Ester | Di(2-Ethylhexyl) Adipate |
| Akzo Nobel | Ketjenflex 8 | Sulfonamide | Toluene-sulfonamide |
| Velsicol | Benzoflex 9-88 | Benzoic Acid Ester | Dipropylene Glycol Dibenzoate |
| Velsicol | Benzoflex P-200 | Benzoic Acid Ester | Polyethylene Glycol Dibenzoate |
| Rhone-Poulenc | Alkapol SQR-490 | Polypropylene Oxide | Polyoxypropylene Aryl Ether |
| Sartomer | Sartomer 660 (Cryoflex) | Formic Acid Ester | Dibutoxy-ethoxyethyl Formal |
| Sartomer | Sartomer 650 (Wareflex) | Adipic Acid Ester | Dibutoxy-ethoxyethyl Adipate |

In each case, the added plasticizer must be compatible with the acrylic PSA being used in the formulation. The amount of plasticizer added to the PSA formulation is dependent upon the molecular weight of the adhesive. It is preferred that a minimum amount of plasticizer be used. Specifically, it is one feature of the invention to obtain improved substrate bonding characteristics without sacrificing cohesive strength or shear strength performance. Typically, as much as about 10 parts by weight plasticizer per 100 parts adhesive can be added without compromising cohesive strength for high molecular weight, (Mw greater than about $1\times10^6$), adhesives. In the case of lower molecular weight, (Mw less than about $3\times10^5$), no more than about 5 parts by weight per 100 parts adhesive is needed.

Method of Making Plasticized Acrylic PSAs

Plasticizer can be added to the acrylic pressure sensitive adhesives at numerous points during the adhesive formulation process. For example, the plasticizer may be added to the acrylic copolymer or terpolymer solutions either prior to or following polymerization, it may be blended into the melt for hot-melt acrylic PSAs during coating, it may be added to the monomer syrup of ultraviolet- or thermally- polymerized acrylate PSAs, or it may be added to a water-based acrylate PSA emulsion.

For these methods, it is preferred that the plasticizer is miscible with the acrylate PSA or its solution, is soluble in any solvents that are present, is thermally stable in hot melt applications, does not substantially interfere with the polymerization reaction or the crosslinking process, and forms a stable emulsion along with the acrylate PSA in water-based adhesive formulations.

The present invention has particular applicability in connection with vinyl films for graphic marking film and labels.

In one embodiment, the vinyl film can be an extendible polyvinylchloride backing for use in decorative labels and graphic marking films. As noted above, a tamper-resistant vinyl film may also be made. Such tamper-resistant films have particular applicability for use as warning, instruction or safety labels which break apart when tampered with, making the label difficult or impossible to remove.

A typical film construction is shown in FIG. 1 in which the film 10 comprises a film layer 12, such as a 2 mil (0.05 mm) vinyl/acrylate film having an acrylic PSA 14 applied to one surface thereof. A release liner 16 such as silicon-coated paper or film is adhered to the PSA until the film is ready to be adhered to a surface.

The film may be made tamper-resistant by die cutting the film layer 12 with a 60T microperforated steel rule. The "micro-rough" edges imparted to the film enhance its "tear" or "breaking" characteristics.

Films of the type depicted in FIG. 1 can be applied to low energy plastic surfaces such as high density polypropylene (HDPP) and high density polyethylene (HDPE) parts. Such parts are useful in many outdoor applications including, but not limited to, lawn and garden equipment, recreational vehicles, all-terrain vehicles, snowmobiles, motorcycles and watercraft. The particular parts include, but are not limited to, covers, hoods and fenders which are decorated with films forming vinyl graphic marking films, warning labels and instructional labels.

For the films of the present invention, measured peel adhesions at a moderate peel rate of about 90 inches (230 cm) per minute should be greater than 4 pounds per inch (18N/25 mm width) to achieve adequate bonding characteristics to high density polyethylene. Dead load shear performance of 10,000 minutes or greater is desired as measured by the PSTC-7 Static Shear Test (1.6 $cm^2 \times 1.6$ $cm^2/1$ kilogram) described below. However, for applications in which vinyl graphic marking film or label films are applied to the parts described above, this level of dead load shear performance is not required. It is preferable, however, that the PSA has sufficient adhesive strength to resist shrinkage forces which may be imparted by the graphic marking film or label film to which the adhesive is applied.

EXAMPLES

Testing Protocol 1. 180° Peel Adhesions PSTC-1: Based on the Pressure Sensitive Tape Counsel (PSTC) test standard, a 1 inch (2.54 cm) wide strip of PSA coated 2 mil (0.05 mm) vinyl film is laminated to a high density polyethylene test panel. The test specimen is backed with a standard 2 mil vinyl film for reinforcement. The applied test specimen is allowed to equilibrate for about 24 hours at about 72° F. (22° C.) and about 50% relative humidity. The test sample is than peeled at an angle of 180° and a speed of about 12 or 90 inches (30 or 230 cm) per minute, using a Lloyd, Instron or IMASS peel test machine. The peel adhesion measurement is reported in pounds per inch width or kilograms per 2.54 centimeters width.

2. Static Shear PSTC-7: A ½ inch square (1.6 $cm^2$) sample PSA coated rigid foil or polyester film is laminated to #304 Stainless Steel to test for holding power or cohesive strength. The sample is allowed to equilibrate for about 24 hours at about 72° F. (22° C.) and about 50% relative humidity before a 1 kilogram weight is applied. The test is run at about 72° F. (22° C.) and about 50% relative humidity conditions. The time to fail, when the sample separates from the panel in minutes is recorded. The failure mechanism is also recorded which is either "pop-off" wherein no adhesive residue remains on the panel or the backing, or "cohesive" wherein adhesive remains on both test panel and test sample.

3. Film Shrinkage: This test is an additional test used to measure internal adhesive or shear strength. It relates directly to actual product use conditions. This test measures the ability of the PSA to "hold the vinyl film in place" or to resist the shrinkage forces imparted by the vinyl film. A 2½ inch (6.35 cm) by 4 inch (10.2 cm) PSA coated vinyl film sample is applied to an aluminum panel. The applied vinyl film sample is slit with a razor blade in both the crossweb and machine direction and is conditioned at 150° F. (65.6° C.) for 24 hours. Measurements in one-one thousand inch (mils) increments of the razor cut openings are recorded. The razor slit will tend to separate or widen for adhesives with poor internal or cohesive strength. Generally a gap opening of 10 mils or greater indicates that the PSA has poor shear strength while adhesives that have good shear or cohesive strength will show small gap openings, less than 10 mils, and will hold the vinyl film in place.

Example 1—Solution Cast Sample

A pressure sensitive acrylic adhesive for low energy surfaces was formulated by adding to 100 parts (solids) of a high molecular weight, (Mw greater than $1 \times 10^6$), 93/7 isooctylacrylate/acrylic acid (IOA/AA) copolymer solution (25% solids in ethyl acetate), 20 parts Foral®, 10 parts Hercolyn®-D, and 100 parts Pycal® 94. To this formulation, 0.6 parts Bisamide crosslinker per 100 parts adhesive (5% solution in toluene) is added. The solution was mixed for 1 minute and rolled for an additional hour to reduce air entrapment. The adhesive composition is coated onto silicone release liner, and then dried in an oven for 5 minutes at a temperature of 200° F. (93.3° C.). A coating weight of 0.6 g/24 $in^2$ (155 $cm^2$) was targeted.

The coated pressure sensitive adhesive of this example was laminated to various films to produce labels and graphic marking films. In one embodiment, the film may be a polyvinylchloride film which is made flexible by the presence of a PVC-compatible plasticizer or, alternatively, the film may be a brittle, destructible polyvinylchloride film which contains both a PVC-compatible plasticizer and a copolymer resin, such as a methylacrylate/butylacrylate copolymer resin.

Example 2—Hot Melt Sample

A pressure sensitive acrylic adhesive coated vinyl graphic marking film for low energy surfaces was made by formulating an adhesive with a composition of 100 parts by weight of a low molecular weight, (Mw less than $3 \times 10^5$), 95/5/0.4 isooctylacrylate/acrylic acid/4-acryloxybenzophenone terpolymer, 15 parts by weight Foral®85, 5 parts by weight Hercolyn®-D, and 5 parts by weight Pycal® 94.

This formulation was hot melt coated onto a silicone release liner at a coating weight of 0.6 g/24 $in^2$ (155 $cm^2$) and exposed to a UV light dose of 525 mj/$cm^2$. (National Institute of Standards and Technology in accordance with EIT and MIL-STD 45662A). A pressure sensitive adhesive coated vinyl film was prepared as described in Example 1.

Performance Data

The data in FIG. 2 shows the effects that tackifier and plasticizer have on peel adhesion on high density polyethylene plastic. 180° peel adhesion values greater than 17 Newtons per 25 mm width, at a peel rate of 30 cm/minute, are realized when a tackified pressure sensitive adhesive is formulated with Pycal®94 plasticizer. With an increased peel rate of 230 cm/minute, the Pycal®94 plasticized PSA exhibits peel adhesions greater than 20 newtons/25 mm width. These results are unique in that the highest peel adhesions are observed for tackified acrylic PSAs which have been plasticized with Pycal®94. At a fast peel rate of 230 cm/minute, the difference in 180° peel adhesions on high density polyethylene are even greater for Pycal®94 modified acrylic adhesives than those adhesives without plasticizer.

Internal adhesive strength is another important performance characteristic. In applications where vinyl graphic films or decals are coated with acrylic PSA, the adhesive must have enough internal strength to resist the inherent tendency of the vinyl to shrink. Adhesive strength is most commonly measured by a dead load or static shear test, as described in PSTC-7. An alternative method for determining adhesive strength is to measure the film shrinkage of the PSA-coated vinyl film.

The data in FIG. 3 shows how film shrinkage is effected by the addition of the Pycal®94 plasticizer tackified acrylic PSA. The addition of the Pycal®94 to the PSA formulation able from 3M) using the same screen and dried an additional 1 hr at 150° F. (66° C.).

The static shear data in Table IV correlate with the film shrinkage test results. Those plasticized PSA samples with less than 10,000 minutes of shear exhibit cohesive or internal adhesive failure. These measurements were made at 23° C,. using a 1000 gram weight with a sample area of 1.6 cm$^2$. Also shown in Table IV are plasticizers with high film shrinkage or low static shear values. Although not wishing to be bound by any particular theory, this may indicate incompatibility of those plasticizers with the acrylic PSA.

In summary, the data presented in Table IV and FIGS. 2 and 3 shows that increased peel adhesions to low energy surfaces, such as high density polyethylene, can be achieved with addition of tackifiers and specific plasticizers without compromising internal adhesive strength.

TABLE IV

95/5/0.4 IOA/AA/ABP Polymer with 15 Parts Foral ® 85 & 5 Parts Hercolyn ®-D Tackifiers

| Plasticizer | 180° Peel Adhesion (N/25 mm) | | Film Shrinkage (mm) | | STATIC SHEAR @23° C. (minute) | |
|---|---|---|---|---|---|---|
| | 30 cm/minute | 230 cm/minute | No Ink | 3900 Solvent Ink | Chromate | Primed Aluminum |
| 5.0% Pycal 94 | 19.8 | 22.9 | 0.150 | 0.250 | 10,000+ | |
| 5.0% Santicizer 97 | 11.0 | 19.4 | 0.175 | | 10,000+ | |
| 5.0% Santicizer 141 | 15.4 | 21.6 | 0.175 | 0.250 | 10,000+ | |
| 5.0% Santicizer 154 | 16.3 | 21.6 | 0.175 | 0.275 | 10,000+ | Pop-off |
| 5.0% DOA | 12.3 | 0.0 | 0.175 | 0.275 | 10,000+ | |
| 5.0% Ketjenflex 8 | 16.7 | 18.0 | 0.250 | 0.650 | 80 | Cohesive |
| 5.0% Benzoflex P-200 | 15.4 | 21.6 | 0.175 | 0.325 | 1,500 | Cohesive |
| 5.0% Benzoflex 9-88 | 15.4 | 21.1 | 0.175 | 0.375 | 90 | Cohesive |
| 5.0% Alkopol SQR-490 | 17.2 | 20.2 | 0.200 | 0.300 | 10,000 | Pop-off |
| 5.0% Sartomer 660 | 14.1 | 22.0 | 0.200 | 0.325 | 10,000+ | |
| 5.0% Sartomer 650 | 12.3 | 20.7 | 0.150 | 0.300 | 10,000+ | | does cause a minor change in film shrinkage. However, this slight change is negligible in the overall performance of the vinyl coated PSA.

The data in Table IV shows that different classes of plasticizers may be utilized to achieve the desired performance characteristics. The data includes 180° peel adhesions to high density polyethylene, film shrinkage measurements with and without solvent containing screenprinting inks, and static shear values. The data shows that different classes of plasticizers, when incorporated into the PSA formulation, exhibit peel adhesions over 15 Newtons/25 mm width on high density polyethylene while maintaining film shrinkage performance of less than 0.25 mm.

Shrinkage measurements for PSA coated vinyl films printed with solvent inks were also recorded in Table IV. The ability of the PSA coated vinyl films to resist the effects of solvent ink printing on film shrinkage is important to product performance. Typically, film shrinkage values of PSA coated vinyl films, printed with solvent inks, are double in comparison to non-screenprinted PSA coated vinyl films. In Table IV, under Film Shrinkage, 3900 Solvent Ink, the film was coated with a screen printing ink and a transparent coating. In the first step of the process, a black solvent ink (Scotchcal™ 3905 available from 3M) is screen printed onto a film using a 225-mesh polyester screen. The printed film is dried in a forced draft oven for 1 hr at 150° F. (66° C.). In the second step of the process, the black-printed film is then overcoated with a clear coat (Scotchcal™ 3920 avail- The data in Table V, below, represents a diverse range of PSA copolymers and terpolymers that were modified with plasticizer to enhance adhesion to low energy plastics. Pressure sensitive adhesives made from copolymers of isooctylacrylate/acrylic acid (IOA/AA), 2-methylbutylacrylate/acrylic acid (2-MBA/AA) and 2-methylbutylacrylate/acrylamide (2-MBA/Acm) and terpolymers of isooctylacrylate/methylacrylate/acrylic acid (IOA/MA/AA) and isooctylacrylate/isobornylacrylate/acrylic acid (IOA/IBA/AA) were tested. Pressure sensitive adhesive formulations 1–14 were made by bulk solution polymerization. Formulation 15 was made by solventless ultraviolet polymerization. Average molecular weight ($M_w$) was determined via GPC. Various tackifiers and crosslinking methods were utilized in the PSA formulations.

180° peel adhesions to high density polyethylene increase when Pycal®94 plasticizer is added to the PSA. For example, when 5 parts of Pycal®94 is added to 100 parts of a copolymer consisting of 96 parts 2-methylbutylacrylate and 4 parts acrylamide, the adhesion to the high density polyethylene substrate increases from 2.2N/25 mm width to 6.6N/25 mm width at a peel rate of 230 cm/minute. Peel adhesions increased from 4.4N/25 mm width to 17.2N/25 mm width at a peel rate of 30 cm/minute when 7.5 parts of Pycal®94 is added to 100 parts of adhesive terpolymer consisting of 76 parts of isooctylacrylate, 21.5 parts of isobornylacrylate and 2.5 parts of acrylic acid.

TABLE V

| PSA Formulation 100 Parts | Crosslinker | Tackifier Parts | Plasticizer Parts | Mw | 180° Peel Adhesion (N/25 mm) 30 cm/minute | 180° Peel Adhesion (N/25 mm) 230 cm/minute | Film Shrinkage (mm) No Ink |
|---|---|---|---|---|---|---|---|
| 1  98/2 IOA/AA | 0.6% Aziridine | 25 Foral ® 85 | 5 Pycal ® 94 | 1 × 10⁶ | 17.2 | 20.7 | 0.350 |
| 2  95/5 IOA/AA | 0.3% ABP | 11 Regalrez 6108 | 5 Pycal ® 94 | 2 × 10⁵ |  | 13.2 | 0.125 |
| 3  95/5 IOA/AA | 0.4% ABP | 15 Foral ® 85/5 Hercolyn ®-D | 5 Pycal ® 94 | 2 × 10⁵ | 19.8 | 22.9 | 0.200 |
| 4  93/7 IOA/AA | 0.6% Aziridine | 25 ECR-180/10 Hercolyn ®-D | 10 Pycal ® 94 | 1 × 10⁶ | 15.0 | 23.3 | 0.075 |
| 5  94/6 IOA/AA | 1.5% Azirdine | 12 Nirez ® 2019/7.5 Unitac ® 70 | 11 Pycal ® 94 | 5 × 10⁵ |  | 20.2 | 0.150 |
| 6  90/10 2-MBA/AA | 1.1% Aziridine | None | None | 5 × 10⁵ | 2.2 | 0.9 | 0.125 |
| 7  90/10 2-MBA/AA | 1.1% Azirdine | None | 5 Pycal ® 94 | 5 × 10⁵ | 11.0 | 2.2 | 0.150 |
| 8  96/42-MBA/Acm | 0.2% ABP | None | None | 2 × 10⁵ | 7.9 | 2.2 | 0.175 |
| 9  96/42-MBA/Acm | 0.2% ABP | None | 5 Pycal ® 94 | 2 × 10⁵ | 10.6 | 6.6 | 0.300 |
| 10 76/21.5/2.5 IOA/IBA/AA | 0.6% Aziridine | 20 Regalrez ® 6108 | None | 1 × 10⁶ | 4.4 | 2.2 | 0.100 |
| 11 76/21.5/2.5 IOA/IBA/AA | 0.6% Aziridine | 20 Foral ® 85 | 7.5 Pycal ® 94 | 1 × 10⁶ | 17.2 | 17.6 | 0.150 |
| 12 76/21.5/2.5 IOA/IBA/AA | 0.6% Aziridine | 20 Regalrez ® 6108 | 7.5 Pycal ® 94 | 1 × 10⁶ | 17.2 | 3.5 | 0.125 |
| 13 70/22.5/7.5 IOA/MA/AA | 0.15% ABP | None | 5 Pycal ® 94 | 2 × 10⁵ | 13.6 | 11.0 | 0.200 |
| 14 85/10/5 IOA/MA/AA | 0.4% ABP | 15 Foral ®/5 Hercolyn ®-D | 5 Pycal ® 94 | 2 × 10⁵ | 19.4 | 23.3 | 0.125 |
| 15 90/10 IOA/AA | 0.2% Triazine | None | 4 Santicizer ® 141 | 1.5 × 10⁶ | 6.6 |  | 0.250 |

Equivalents

Various modifications and alterations to this invention will become apparent to those skilled in the art without departing from the scope and spirit of this invention. It should be understood that this invention is not intended to be unduly limited by the illustrative embodiments and examples set forth herein and that such examples and embodiments are presented by way of example only with the scope of the invention intended to be limited only by the claims set forth herein as follows.

We claim:

1. An acrylic pressure sensitive adhesive which comprises:
   a) about 100 parts by weight of an acrylic copolymer, said acrylic copolymer comprising from about 70–98% by weight of one or more monofunctional acrylates having nontertiary alkyl groups with between 1 and 14 carbon atoms and from about 30–2% by weight of a polar monomer;
   b) about 10–40 parts by weight of a tackifier;
   c) about 3–10 parts by weight of a plasticizer; and
   d) optionally, a crosslinker;
   wherein thee plasticizer is selected from the group consisting of polyoxyethylene aryl ethers, polyoxylpropylene aryl ethers, phosphate esters, sulfonamides, aromatic carboxylic acid esters, and combinations thereof.

2. The acrylic pressure sensitive adhesive of claim 1 wherein the monofunctional acrylate is selected from the group comprising ethylenically-unsaturated alkyl acrylates.

3. The acrylic pressure sensitive adhesive of claim 1 wherein the polar monomer is selected from the group consisting of ethylenically-unsaturated carboxylic acids and acrylamides.

4. The acrylic pressure sensitive adhesive of claim 1 wherein the tackifier is selected from the group comprising terpene phenolics, rosins, rosin esters, esters of hydrogenated rosins, synthetic hydrocarbon resins and combinations thereof.

5. An adhesive film adapted for use on low energy surfaces which comprises:
   a) a polymeric backing; and
   b) a pressure sensitive adhesive applied to a surface of the polymeric backing, the pressure sensitive adhesive comprising:
      i) about 100 parts by weight of an acrylic copolymer, said acrylic copolymer comprising from about 70–98% by weight of one or more monofunctional acrylates having nontertiary alkyl groups with between 1 and 14 carbon atoms and from about 30–2% by weight of a polar monomer;
      ii) about 10–40 parts by weight of a tackifier;
      iii) about 3–10 parts by weight of a plasticizer; and
      iv) optionally, a crosslinker;
   wherein the plasticizer is selected from the group consisting of polyoxyethylene aryl ethers, polyoxypropylene aryl ethers, phosphate esters, sulfonamides, aromatic carboxylic acid esters, and combinations thereof.

6. The adhesive film of claim 5 wherein the polymeric backing comprises a material selected from the group consisting of vinyl films, woven and nonwoven sheets, woven and nonwoven fabrics, papers and retroreflective sheeting.

7. The adhesive film of claim 5 wherein the monofunctional acrylate is selected from the group comprising ethylenically-unsaturated alkyl acrylates.

8. The adhesive film of claim 5 wherein the polar monomer is selected from the group consisting of ethylenically-unsaturated carboxylic acids and acrylamides.

9. The adhesive film of claim 5 wherein the tackifier is selected from the group comprising terpene phenolics, rosins, rosin esters, esters of hydrogenated rosins, synthetic hydrocarbon resins and combinations thereof.

10. A graphic marking or label having a visible surface and formed from the adhesive film of claim 5 wherein the visible surface conveys information or provides decoration.

11. A graphic marking or label having a visible surface and formed from the adhesive film of claim 5 having edges which are microrough.

12. The adhesive film of claim 5 which comprises a transfer adhesive having a backing comprising a release liner.

13. A double-sided tape comprising a polymeric film having two surfaces, each surface having an adhesive thereon, wherein at least one such adhesive comprises the adhesive of claim 1.

14. A process for making the adhesive of claim 1 which includes the steps of:
 a) hot melt coating the adhesive; and
 b) curing the adhesive using ultraviolet light.

15. A process for making the adhesive of claim 1 which includes the steps of:

a) casting a syrup of the adhesive; and
 b) curing the adhesive using ultraviolet light.

16. The adhesive film of claim 5 which further includes a release liner.

17. The adhesive film of claim 16 wherein the release liner has a microtextured surface.

\* \* \* \* \*